US007398134B2

(12) United States Patent
Carley et al.

(10) Patent No.: US 7,398,134 B2
(45) Date of Patent: Jul. 8, 2008

(54) SORTING APPARATUS WITH ARBITRARY USER-SPECIFIED SEQUENCE CONTROL

(75) Inventors: Daniel J. Carley, Lansing, KS (US); Robert R. Montgomery, Leavenworth, KS (US); James B. Scherer, Lansing, KS (US); George Smith, Basehor, KS (US); Terry Wessel, Osage City, KS (US); John George, Overland Park, KS (US); Barbara Enright-Anderson, Lenexa, KS (US)

(73) Assignee: Hallmark Cards, Incorporated, Kansas City, MO (US)

( * ) Notice: Subject to any disclaimer, the term of this patent is extended or adjusted under 35 U.S.C. 154(b) by 445 days.

(21) Appl. No.: 10/931,948

(22) Filed: Sep. 1, 2004

(65) Prior Publication Data

US 2006/0058916 A1 Mar. 16, 2006

(51) Int. Cl.
*G06F 7/00* (2006.01)
*B65B 35/50* (2006.01)

(52) U.S. Cl. ..................... 700/221; 700/213; 414/788.1

(58) Field of Classification Search .............. 414/788.1, 414/788.2, 788.3, 788.9, 273; 700/213, 214, 700/216, 219, 220, 221, 223, 224, 225, 226, 700/236, 240; 53/474, 443, 445, 446, 447, 53/147, 165, 531, 540, 154; 198/349
See application file for complete search history.

(56) References Cited

U.S. PATENT DOCUMENTS 3,657,860 A 4/1972 Franklin
3,802,154 A 4/1974 Dillon
4,071,998 A 2/1978 Meadows
4,488,610 A 12/1984 Yankloski
4,688,678 A 8/1987 Zue et al.
4,785,610 A 11/1988 Valenti
4,810,550 A 3/1989 Gasser
5,503,519 A 4/1996 Schwetz et al.
5,669,755 A 9/1997 Zahn
5,720,157 A * 2/1998 Ross .......................... 53/445
5,810,550 A 9/1998 Reaves
5,938,066 A * 8/1999 DeMars .................. 220/574.1
6,145,281 A 11/2000 Hansen et al.
6,208,908 B1 * 3/2001 Boyd et al. ................ 700/216
6,254,096 B1 7/2001 Grauzer et al.
6,412,255 B2 7/2002 Hidding et al.
6,591,587 B2 7/2003 Salm et al.
6,694,706 B1 2/2004 Odenthal et al.
6,721,762 B1 * 4/2004 Levine et al. ............ 707/104.1

(Continued)

*Primary Examiner*—Gene O. Crawford
*Assistant Examiner*—Ramya G. Prakasam
(74) *Attorney, Agent, or Firm*—Fish & Richardson P.C.

(57) ABSTRACT

A sorting system may include a sorting apparatus coupled to a programmable control system which is configured to actuate the sorting apparatus so that it assembles similar products for packaging in an arbitrary, user imposed order or selection bias. In preferred implementations, a user may activate a biasing protocol pursuant to which items bearing certain images appear with a disproportionate frequency on the top of a stack of items such that the selected images are the most common images viewable through a transparent product packaging. In certain implementations, empirical sales data is used to determine weighting factors used in the biasing protocol. In still other implementations, a more specific ordering protocol is imposed by a user such that some or all of the sequence of items in a stack or collection is arbitrarily imposed.

22 Claims, 10 Drawing Sheets

U.S. PATENT DOCUMENTS

| | | | | |
|---|---|---|---|---|
| 6,746,202 | B2 | 6/2004 | Mader et al. | |
| 6,876,958 | B1 * | 4/2005 | Chowdhury et al. | 703/7 |
| 6,892,104 | B2 * | 5/2005 | Patil et al. | 700/95 |
| 7,062,893 | B2 * | 6/2006 | Lawton et al. | 53/564 |
| 7,133,851 | B1 * | 11/2006 | Benson | 705/410 |
| 2002/0187821 | A1 | 12/2002 | Soltys et al. | |
| 2003/0024841 | A1 * | 2/2003 | Murphy | 206/459.5 |
| 2005/0055988 | A1 * | 3/2005 | Escobar et al. | 53/540 |
| 2005/0187646 | A1 * | 8/2005 | Wen et al. | 700/95 |

* cited by examiner

SORTING APPARATUS WITH ARBITRARY USER-SPECIFIED SEQUENCE CONTROL

TECHNICAL FIELD

This application relates to apparatus and methods for imposing an arbitrary user-specified item order in a package of similar items, such assortments and variety packs of merchandise.

BACKGROUND

Various products are offered as assortments of similar items. Examples include stationery, greeting cards, and paper plates. In the case of stationery, a container may include three or more styles of paper and envelopes. The container may include a transparent top surface which permits the user to view one or more of the styles contained within the package. Where the size of the container is to be minimized and therefore the stationery is provided in a single stack, a potential purchaser can see only the style of stationery which happens to be on the top of the stack. Accordingly, the packaging may indicate or depict in some fashion the various styles of stationery which are contained within the package. However, a potential purchaser may overlook such labels and mistakenly believe the container includes only a single style of stationery. Where certain styles of stationery are perceived as less desirable by the consumer base, this may impede the sales of certain packages of stationery even though they may contain substantially the same assortment of stationery.

Greeting cards may also be offered in assortment or variety packs. They may be packaged in fashion similar to that described above in connection with stationery. There may be one or more of the assortment of greeting cards which are visible to a potential purchaser. Especially where only a single greeting card is viewable through the product packaging, there may be a tendency for purchasers to ignore any indication on the product packaging that a variety of greeting cards is contained therein.

Recently, paper plates have been offered which bear fanciful images that appeal to children. The images may include animals, cartoon characters, or other proprietary images. The plates may be packages in groups of ten, twelve or more, and each pack may contain multiple instances of the same plate design. A given package typically contains a variable quantity of each plate design and the plates appear in random order. Where the plates are nested in a stack and thus only the top plate is viewable through the associated packaging, purchasers may tend to buy packages preferentially based on the image borne by the top most plate.

SUMMARY

A sorting system may include a sorting apparatus coupled to a programmable control system which is configured to actuate the sorting apparatus so that it assembles similar products for packaging in an arbitrary, user imposed order or selection bias. In preferred implementations, a user may activate a biasing protocol pursuant to which items bearing certain images appear with a disproportionate frequency on the top of a stack of items such that the selected images are the most common images viewable through a transparent product packaging. In certain implementations, empirical sales data is used to determine weighting factors used in the biasing protocol. In still other implementations, a more specific ordering protocol is imposed by a user such that some or all of the sequence of items in a stack or collection is arbitrarily imposed.

Certain implementations provide one or more of the following advantages. Various implementations enable a user to maximize point-of-sale product performance by selectively controlling the images that are viewable in assortment or variety packs of merchandise. In other implementations, sequences or orders of images can be selectively imposed such that the images correlate with a story line associated with the images borne on the plates.

The details of one or more implementations are set forth in the accompanying drawings and the description below. Other features, objects, and advantages will be apparent from the description and drawings, and from the claims.

DETAILED DESCRIPTION OF ILLUSTRATIVE IMPLEMENTATIONS

Figure 1A:
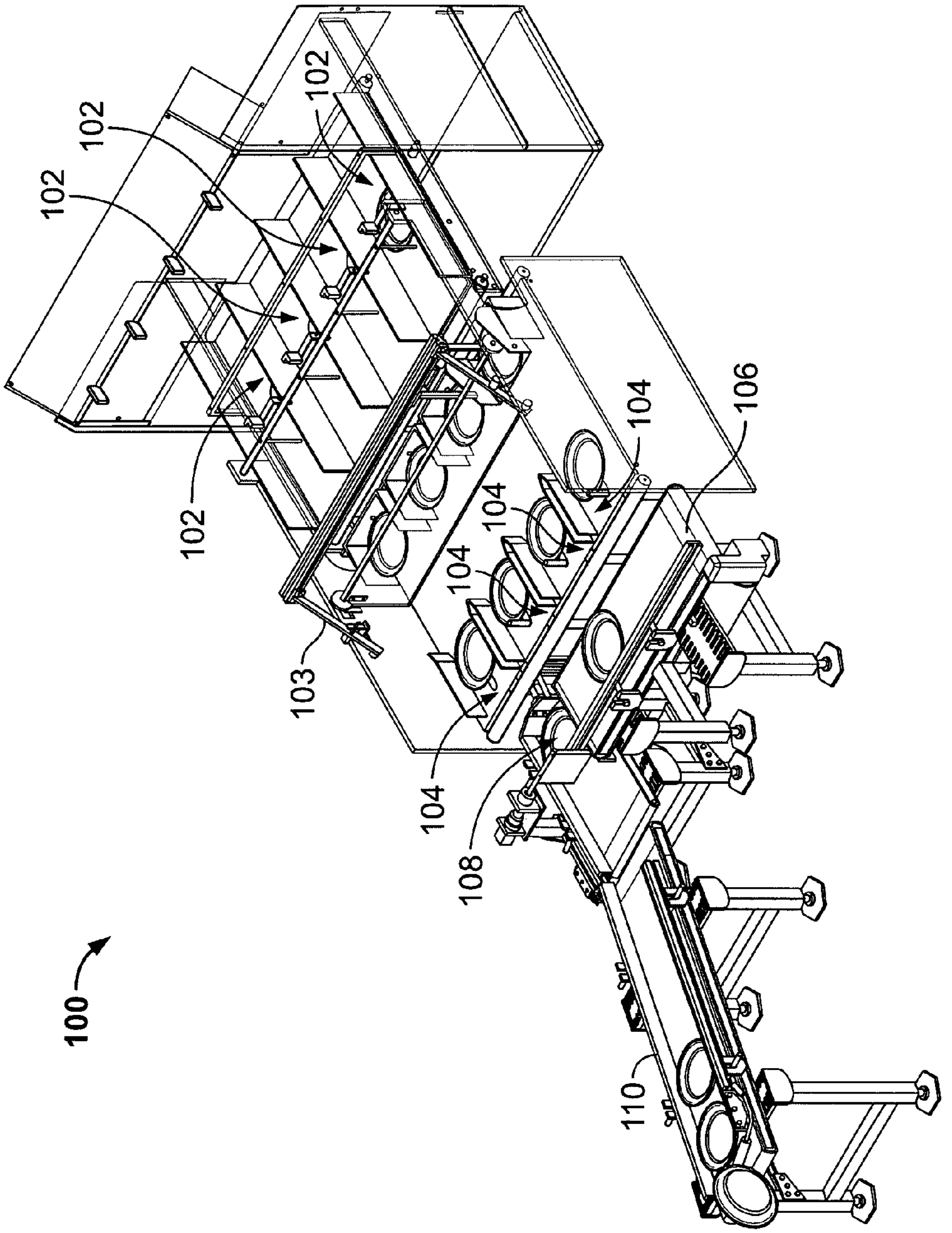
FIG. 1A is a block diagram of apparatus that may be used to sort items, such as paper plates, wherein each plate has a displayable image contained thereon.

FIG. 1A is a block diagram of sorter 100 that may be used to sort items, such as paper plates, that each has a displayable image contained thereon. In one implementation, the sorter 100 comprises a material-handling system that sorts image-bearing items. Once the sorter 100 has sorted a certain number of items, it may stack and package these items, which may later be provided for display or sale in a retail store. In many situations, a package containing a stack of multiple items will have one item on the top of the stack. This top item may have an image printed thereon that is viewable to an individual, such as a customer. For example, a customer may be able to see the image printed on the top-most item of the stack if the entire stack is wrapped in transparent, or semi-transparent, plastic. The sorter 100 shown in FIG. 1A is capable of sorting items that are included within any given stack, and is further capable of determining the top-most item in any given stack based upon the image printed on that item.

The sorter 100 includes channel conveyors 102, a stop arm 103, channel dispensing areas 104, a dispensing conveyor 106, a stacking area 108, and a loading conveyor 110. The channel conveyors 102 include one conveyor for each of the four channels. The four channels are separated from each other by vertical channel walls. In alternate implementations, different numbers of channels may be used. Each conveyor is capable of holding and moving one or more different items.

The sorter 100 also includes, or is coupled to, an item source component (not shown). The item source component provides the items to the channel conveyors. In one implementation, wherein the items comprise paper plates, the items source component includes an apparatus that is capable of cutting and shaping sheet material to form the paper plates that are then fed to the channel conveyors 102. Each of these plates has a displayable image that is printed on one side of the plate. The sheet material is printed with a predetermined array of images each corresponding to a paper plate. Each image is then cut from the web and stamped in a predetermined sequence. According, the plates arrive at the channel conveyors 102 in a predetermined order. Alternately, the image recognition systems described below may be used to determine the images borne by the plates fed into the channel conveyors 102.

The channel conveyors 102 provide items to holding units, or areas. Each of the four channels has a corresponding holding area. The stop arm 103 is coupled a movable wall that either permits or restricts movement of items from the holding areas to the channel dispensing areas 104. Each channel holding area may hold one or more items in each channel. Multiple items can be stacked within the holding areas. In one implementation, a programmable logic controller (PLC) actuates the stop arm to raise or to lower the movable wall. Photodetectors may be deployed in the holding areas 103 to provide input signals to the PLC indicating whether the respective holding areas have received one or a stack of plates. One each photodetector signals the presences of plates in the respective holding areas 103, the PLC sends a control signal that actuates a servo motor coupled to the stop arm 103, thereby raising it. At this point, the items in the holding areas are able to move into the channel dispensing areas 104.

In other implementations, photodetectors can be used to determine the number of plates are contained within the respective holding areas 103. The PLC is accordingly configured to monitor the input from the photodetectors and thereby determine the quantity of plates in each holding area.

The conditions under which the stop arm will be actuated are user configurable. In the context of the aforementioned implementations, the user can select the quantity of plates which are to exist in each holding area before actuation of the stop arm. The user can also program the stop arm to actuate when a certain holding area or areas has a plate or a prescribed number of plates.

A given row of items is transported by the channel conveyors 102 into the holding areas and then eventually into the channel dispensing areas 104. Once the items have been moved to the channel dispensing areas 104, they may then be dispensed onto the conveyor 106. As shown in the example of FIG. 1A, there are four distinct channel dispensing areas, one for each channel. There may be one or more items stacked and contained within each channel dispensing area. The items are dispensed from the dispensing areas in a sequential, serial fashion. For example, the one or more items contained in a first channel dispensing area may be dispensed first, the one or more items contained in a second channel dispensing area may be dispensed second, the one or more items contained in a third channel dispensing area may be dispensed third, and the one or more items contained in a fourth channel dispensing area may be dispensed fourth (last).

Once dispensed, the items are transported by the conveyor 106 to the stacking area 108. All of the items contained within the four channel dispensing areas 104 during a given dispensing cycle are stacked in the stacking area 108. Because the items are dispensed from the dispensing areas 104 in a sequential fashion, the items that are dispensed last in the sequence are located at the top of the stack in the stacking area 108. Thus, for example, if each of the dispensing areas 104 contain one plate, and the plate in the fourth dispensing area is dispensed last onto the conveyor 106, this plate will be located on the top of the stack in the stacking area 108.

The stack of plates that is contained within the stacking area 108 is, after a given dispensing cycle is complete, loaded to a packaging area by the loading conveyor 110. In one implementation, stacks of plates are packaged in transparent plastic containers, which may then be transported to commercial venues for sale to customers.

As noted above, each of the items has printed thereon a viewable image. For example, in one implementation, the items are paper plates that have movie characters printed thereon. In this implementation, the top plates that are provided to each channel dispensing area have different cartoon characters printed on them. If each channel dispensing area contains one plate during a given dispensing cycle, the plate in one dispensing area has printed on it a different movie character than the plates contained in the other dispensing areas. If each channel dispensing area contains more than one plate (e.g. six plates) during a dispensing cycle, the top plate of the stack in one dispensing area has printed on it a different movie character than the top plates of the stacks in the other dispensing areas.

In one implementation, the sorter 100 uses predefined dispensing sequences, or orders, for dispensing of items from the dispensing areas 104. For example, the sorter 100 may be configured to use a repeated dispensing sequence of first (channel dispensing area), second (channel dispensing area), third (channel dispensing area), and fourth (channel dispensing area) for every dispensing cycle. In another example, the sorter 100 may be configured to use a set of different dispensing sequences in a periodic fashion. For instance, the sorter 100 may be configured to use alternating dispensing sequences of first, second, third, and fourth followed by fourth, third, second, and first.

In one implementation, the sorter 100 uses dispensing sequences based upon the plate that is to be positioned on top of a given stack in the stacking area 108. During a given dispensing cycle, the stack of plates contained in the stacking area 108 may include four, sixteen, twenty four, etc., plates. The sorter 100 may implement an algorithm that specifies which plate is to be positioned on the top of a given stack based upon the image that is printed upon that plate. For example, the sorter 100 may use an algorithm specifying that, if a plate having a given movie character is a top plate contained within one of the dispensing areas 104, then that top plate is also to be the top plate in the stack contained in the stacking area 108 for that dispensing sequence.

This functionality is particularly advantageous in situations where point-of-purchase customer behavior is believed to depend on the particular image that is viewable through the top of the package. Where empirical data demonstrates that packages of plates having top plates bearing certain images are less desirable and therefore impede sales, the packages can be assembled such that the less desirable images are contained with the body of the stack and the most impactful images are borne on the tops of the packages.

An algorithm that is used by the sorter 100 to determine which plate (having a particular image printed thereon) is to be the top plate in a stack contained in the stacking area 108 affects the dispensing sequence of items from the dispensing areas 104 to the conveyor 106. As described previously, the plates dispensed last onto the conveyor during a given dispensing cycle will be located at the top of the stack in the stacking area 108.

In another scenario, the sorter 100 may use an algorithm specifying that plates with different cartoon characters printed thereon are to be evenly distributed as top plates in stacks contained in the stacking area 108 across different dispensing cycles. For example, if there are twelve different cartoon characters that are printed on various plates used by the apparatus 100, the sorter 100 may use an algorithm specifying that a plate having printed thereon one of these cartoon characters is to be used as a top plate in a stack once out of every twelve dispensing cycles. Using this algorithm, each of the twelve cartoon characters will be shown on a top plate in a stack for every twelve stacks that are collected within the stacking area 108.

In one implementation, the PLC contains sequencing and selection arrangement information for items that are to be stacked in the stacking area 108. The sequencing information specifies any particular sequences of items, in general, that are to be stacked in the stacking area 108 over various different dispensing cycles. The selection arrangement information specifies which, if any, items are to be included as top-most items in stacks as they are collected in the stacking area 108. The PLC is capable of determining dispensing sequences, or orders, for items that are included within the channel dispensing areas 104. The PLC then provides control signals to motors or hydraulic actuators in the channel dispensing areas to selectively release the items to the dispensing conveyor 106.

In one implementation, the sorter 100 may include image recognition systems located above the channel dispensing areas 104 to determine the images that are printed on the top-most items contained in each of the dispensing areas. An illustrative image acquisition system may include video capture system coupled to a processing unit to execute a recognition program which compares a the video capture (i.e. a still image) to a set of reference or source images. The image recognition systems may then transmit a status packet to the PLC indicating which image is borne by the plate in each dispensing area 104. The PLC may then apply one of the algorithms described herein to control the dispensing sequence for the items contained within the dispensing areas 104 based upon the images printed upon the top-most items.

As shown in the example of FIG. 1A, the sorter 100 processes and dispenses paper plates. However, in various other implementations, the sorter 100 is capable of processing and dispensing various other types of items having displayable images or content printed thereon, such that when stacks or groups of these items are packaged in transparent or semi-transparent material, the displayable images for selected items (such as the top-most items in a stack) are visible to individuals, such as customers. For example, the sorter 100 may be used to process and dispense baseball cards or variety packs of stationery or greeting cards. If such cards are packaged in a transparent or semi-transparent material, such that the top card showing an image of a player is visible to a customer, the sorter 100 may be used to create packets of cards. The sorter 100 may determine a specific sequence of cards that are included in various packets, and/or may also determine which specific cards are to be positioned at the top of packets, such that the images of the players shown on the top-most cards are visible to customers. The sorter 100 may include image recognition systems positioned atop the channel dispensing areas 104 to detect the player images printed on cards before they are dispensed. The image recognition systems are coupled to a PLC, which is in turn programmed to control dispensing sequences based upon the images that are detected.

Figure 1B:
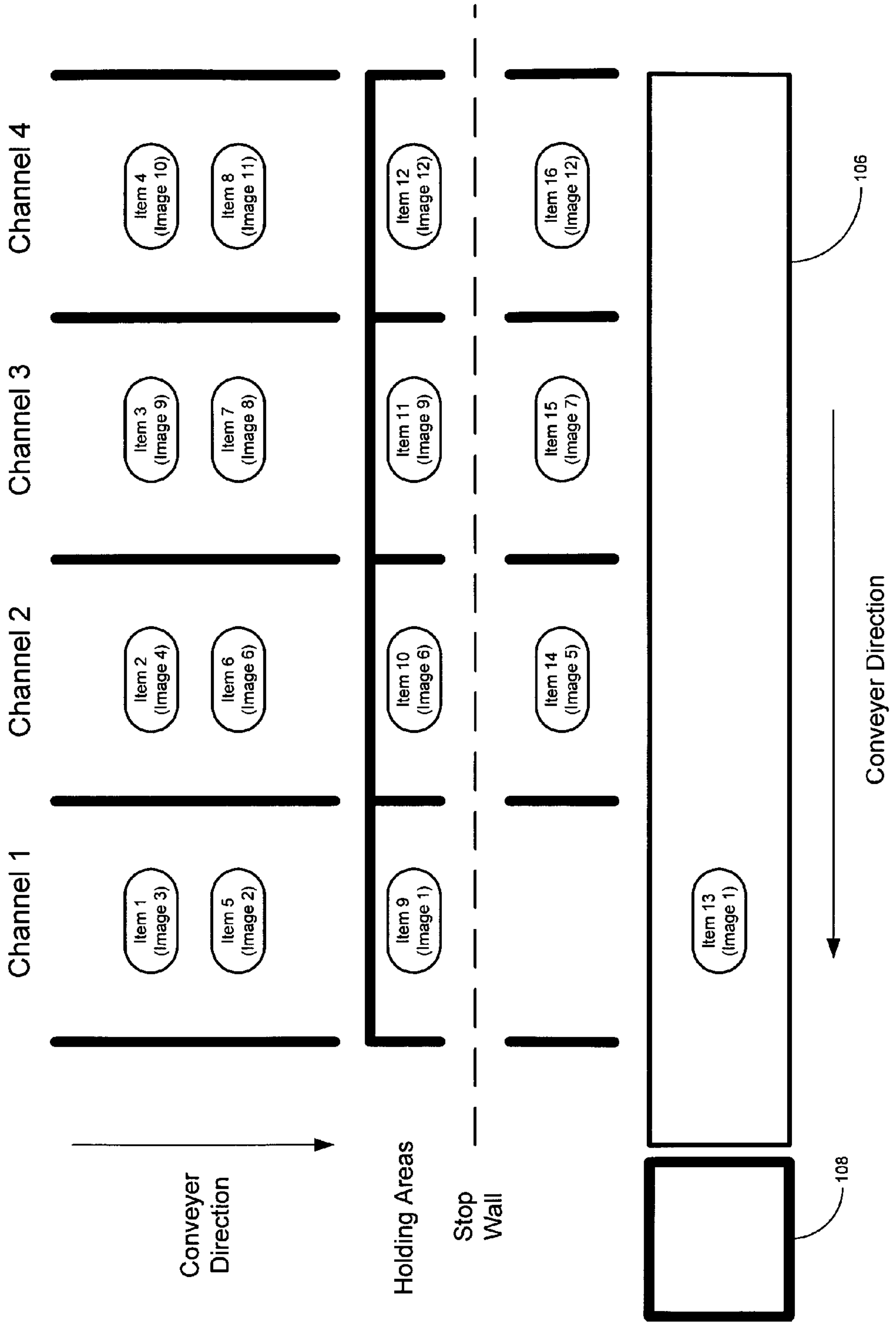
FIG. 1B is a perspective diagram of a top view of a portion of the apparatus of FIG. 1A, according to one implementation.

FIG. 1B is a perspective diagram of a top view of a portion of the sorter 100 of FIG. 1A, according to one implementation. FIG. 1B shows a top view of the four channels in the channel conveyors 102, holding areas, and channel dispensing areas 104 from FIG. 1B. In various other implementations, many different numbers of channels may be used. In the example of FIG. 1B, the sorter 100 has distributed various different items, such as paper plates, across the different channels. In the implementation shown, the sorter 100 distributes the items according to the designs or images that are printed on these items. Although the various items all may be of the same of similar type (e.g., items that are all paper plates), they may have various different designs or images that are printed on their exteriors.

In the implementation shown in FIG. 1B, there are twelve different images that are printed on the items distributed across the four channels. By virtue of the fact that the printing, cutting and stamping techniques are predetermined, sorter 100 delivers to the first channel any items having printed thereon one of the images "Image 1", "Image 2", or "Image 3". Any items to be transported by the channel conveyors 102 having one of these images printed thereon is distributed and assigned to the first channel. The sorter 100 delivers to the second channel any items having printed thereon one of the images "Image 4", "Image 5", or "Image 6". The sorter 100 assigns to the third channel any items having printed thereon one of the images "Image 7", "Image 8", or "Image 9". Finally, the sorter 100 assigns to the fourth channel any items having printed thereon one of the images "Image 10", "Image 11", or "Image 12". Of course, the sorter 100 may use any number of different distribution techniques.

The sorter 100 places sequences of items in the four channels by rows. In FIG. 1B, the sorter 100 has placed a first sequence of items ("Item 1", "Item 2", "Item 3", "Item 4") in a first row, and has placed a second sequence of items ("Item 5", "Item 6", "Item 7", "Item 8") in a second row. These sequences of items are transported together, row by row, on the channel conveyors. The sorter 100 may provide individual items for these item sequences according to the sorting mechanism or selection arrangement that is desired. The sorter 100 may use various algorithms, criteria, etc., to sort items that are stacked within the stacking area 108 or to select items that are to be placed at the top of individual stacks based upon the images printed upon these items. To achieve this, the sorter 100 may place items within the four channels in specific sequences. The sorter 100 may also use or adjust various dispensing sequence orders when dispensing items from the dispensing areas 104, as outlined above and described in more detail below.

The channel conveyors 102 transport sequences of items to the holding areas. The holding areas contain one sequence of items for each channel. Each individual channel holding area can hold one or more items in a stack. The stop wall is a movable wall that restricts movement of the items in the holding areas when it is in a lowered position but that allows movement of the items to the dispensing areas 104 when it is in a raised position. The stop arm 103 controls the movement of the stop wall.

Once items are positioned in the dispensing areas 104, they may be dispensed onto the conveyor 106 and stacked within the stacking area 108. Individual sequences, or rows, of items are dispensed and stacked during individual dispensing cycles. In one implementation, individual stacks contain four items when the dispensing area 104 contains one item per channel. The conveyor 110 transports stacks of items from the stacking area 108.

The sorter 100 uses dispensing sequence orders to dispense items from the dispensing areas 104 to the conveyor 106. The sorter 100 may use many different dispensing sequence orders, as will be described in more detail below. Items that are dispensed first during a dispensing cycle are located at the bottom of a stack within the stacking area 108. Items that are dispensed last during a dispensing cycle are located at the top of the stack.

Figure 2:
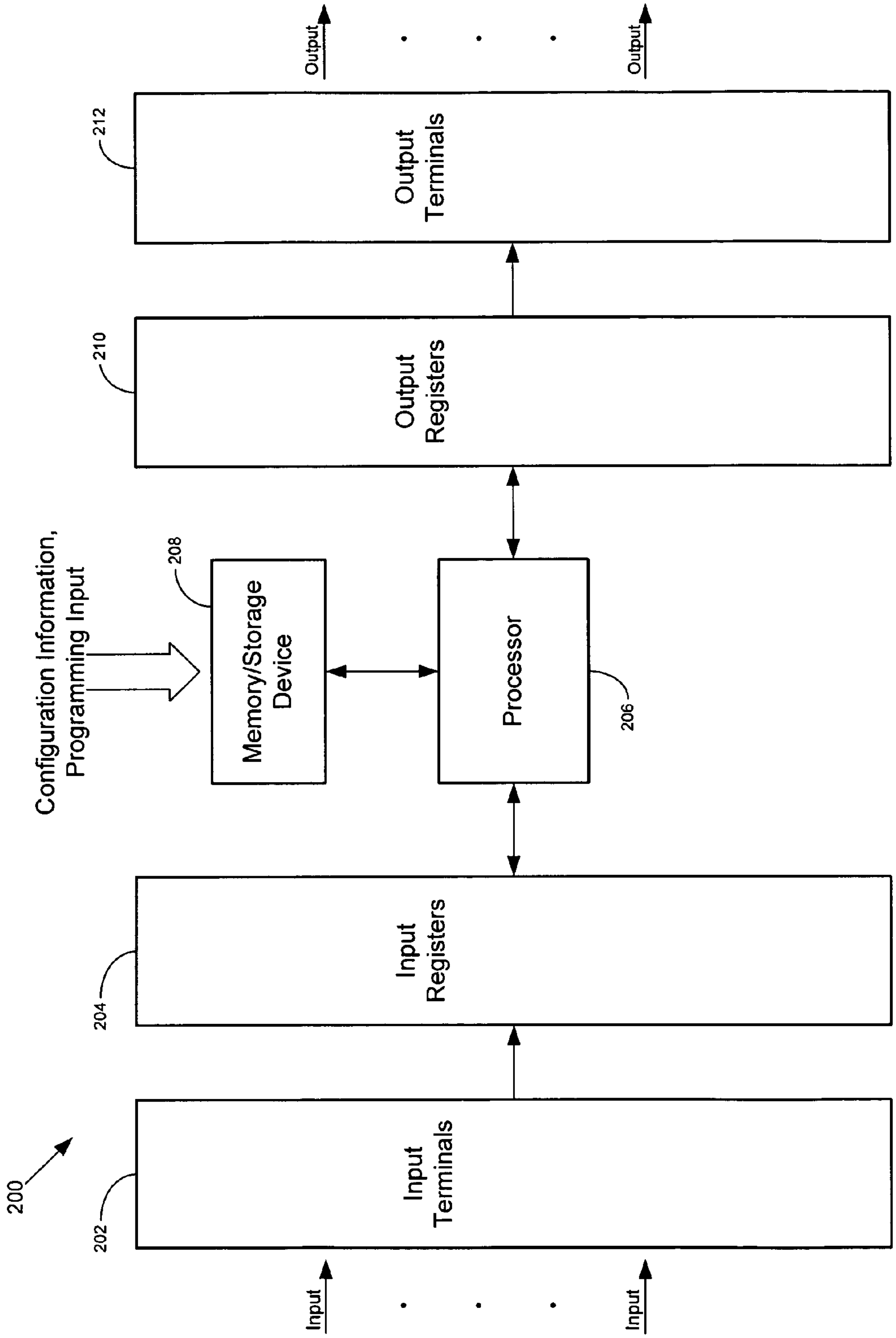
FIG. 2 is a block diagram of a programmable logic controller (PLC) that is contained within or coupled to the apparatus shown in FIG. 1A, according to one implementation.

FIG. 2 is a block diagram of a programmable logic controller (PLC) 200 that is contained within or coupled to the sorter 100 shown in FIG. 1A, according to one implementation. The PLC 200 may be used to control various different operations that are performed by the apparatus 100. The PLC 200 includes input terminals 202, input registers 204, a processor 206, a memory/storage device 208, output registers 210, and output terminals 212. The PLC 200 receives input from the sorter 100 in the input terminals 202. The input terminals contain one or more terminals that may be connected to various sensors, switches, or other input devices from the apparatus 100. For example, sensors that detect the presence and/or the quantity of items in the channel conveyors 102 or in the holding areas may be coupled to the PLC 200. System that count the total number of different image types (such as cartoon characters, baseball players, or other designs) may likewise be coupled to the PLC 200. Additionally, any image recognition systems above the channel dispensing areas 104 that are able to sense or detect the images printed on the top-most items in these areas may also be coupled to the PLC 200.

Signal information received by the input terminals 202 is processed and then provided for storage, in digital form, to the input registers 204, according to one implementation. The input registers 204 store a digital representation of the input information that is received by the PLC 200. The processor 206 is capable of execution instructions that are stored in the memory/storage device 208. These instructions comprise one or more programs that perform various functions, such as determining dispensing sequences or identifying which items are to be placed at the top of stacks within the stacking area 108 during various dispensing cycles. When executing these instructions, the processor 206 may retrieve information contained within the input registers 204. In certain situations, the processor 206 may need information from the input registers 204 in order to perform certain functions. In other situations, the processor 206 is able to perform functions without any additional input. The processor 206 may store results of certain operations within the memory/storage device 208 for later use.

In one implementation, the memory/storage device 208 is a computer-readable medium that includes a volatile memory unit and/or a non-volatile memory unit. In one implementation, the memory/storage device 208 includes a high-density storage element.

The PLC 200 is also capable of receiving external programming input or configuration information that is provided to the memory/storage device 208. An external user is capable of connecting a hand-held device to the PLC 200 and providing manual programming input to the PLC 200 for use when executing instructions. This programming input is of a form recognized by the PLC 200. The external user may also use the connected hand-held device to provide configuration information to the PLC 200. This configuration information may include dispensing sequence information or item selection arrangement that may be used by the PLC 200 to control operation of the apparatus 100, as was described above and will be described in additional detail below. The configuration information may also include item distribution information that specifies how items are to be distributed across the various channels for processing by the channel conveyors 102.

The PLC 200 may also be coupled to an external computing device capable of executing one or more computing applications. An individual user may create programs for or initiate execution of one or more of the computing applications. Additionally, an automated or semi-automated process operable on the computing device may also be capable of creating programs for or initiating execution of one or more of the computing applications. Upon execution, these applications may then provide programming input or configuration information to the PLC 200.

Upon execution of instructions, the processor 206 provides various output information to be used in triggering various actions in the apparatus 100. This output information is stored in the output registers 210 in digital form, according to one implementation. The information stored in the output registers 210 is then provided for use by the output terminals 212, which are connected to output entities in the apparatus 100. The information contained in the output registers 210 determines the output signals that are provided by the output terminals 212. The signals provided by the output terminals 212 cause the connected output entities to perform various physical actions in the apparatus 100. For example, the signals may cause the stop arm 103 to be actuated, or may cause the items in the dispensing areas 104 to be dispensed in a particular sequence or with a particular arrangement.

Figure 3A:
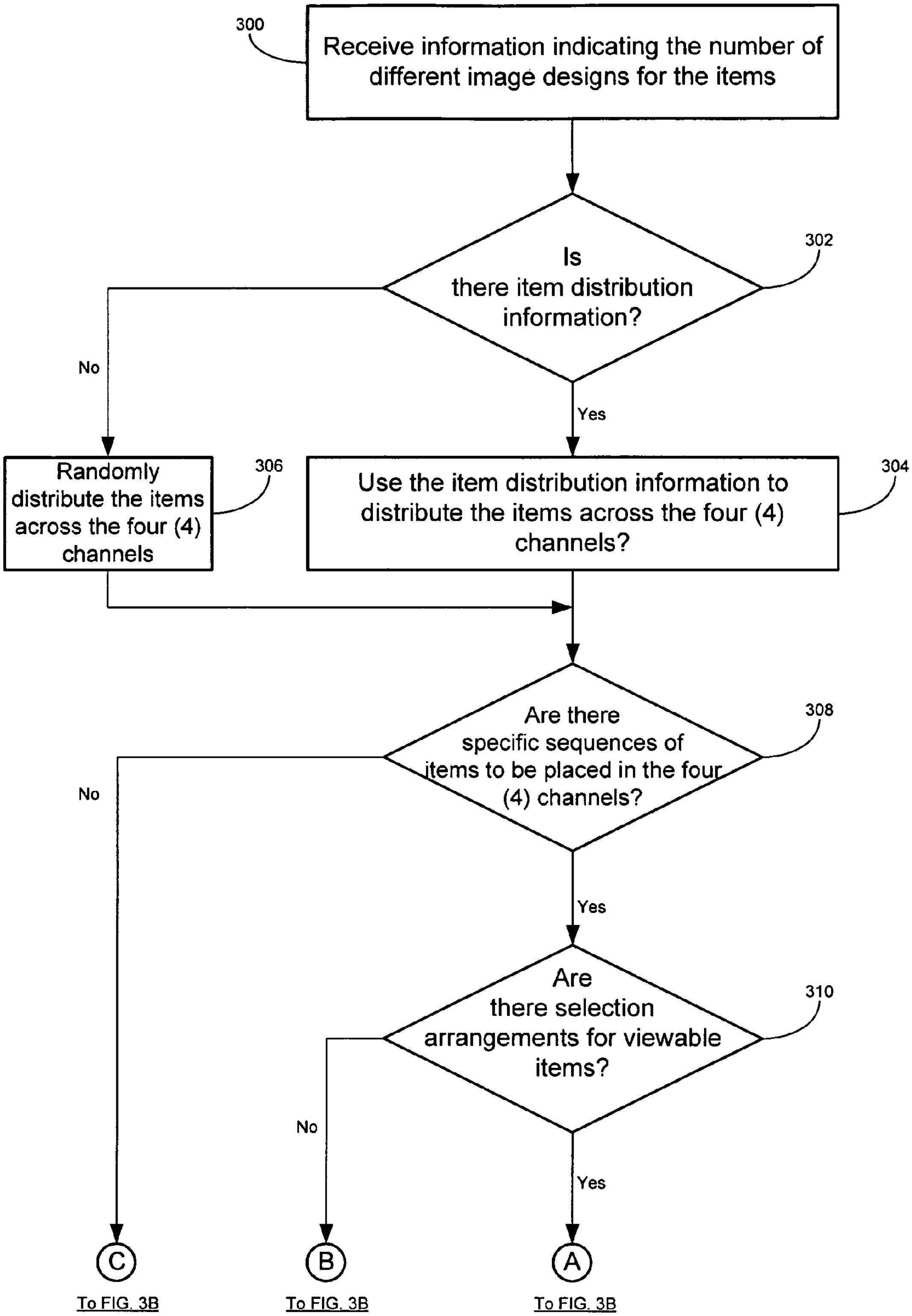
FIG. 3A, FIG. 3B, FIG. 4, and FIG. 5 are flow diagrams of methods that may be performed by the apparatus of FIG. 1A to sort and dispense items, according to one implementation.

FIG. 3A, FIG. 3B, FIG. 4, and FIG. 5 are flow diagrams of methods that may be performed by the sorter 100 of FIG. 1A to sort and dispense items, according to one implementation. FIG. 3A shows a first portion of a method that may be performed by the apparatus 100. (FIG. 3B, which is described below, shows a second portion of this method.) In one implementation, various method acts may be performed by the PLC 200 that is shown in FIG. 2. The method begins with an act 300, when the sorter 100 receives information indicating the number of different image designs for the items to be processed by the channel conveyors 102. In one implementation, the sorter 100 receives this information from a sensor that is coupled to the sorter 100 and provides this information to the PLC 200. The sensor is capable of counting, or otherwise determining, the number of different image designs for the various items. For example, the sensor may be able to count the number of different cartoon characters that are displayed on the paper plates shown in FIG. 1A.

At a checkpoint 302, the PLC 200 determines whether there is any item distribution information for the specific number of different designs. Any such information would be stored in the memory/storage device 208 of the PLC 200, according to one implementation. If there is no such information, the PLC 200 causes the apparatus to randomly distribute the items having the number of different image designs, in an act 306, across the four channels on the channel conveyors 102. If, on the other hand, such information exists, the PLC 200 uses this item distribution information to cause the sorter 100 to distribute items, in an act 304, across the four channels on the channel conveyors 102. For example, if there are items have printed thereon twelve different types (A-L) of image designs, the item distribution information may specify that items having design types A-D are to be distributed to the first channel, items having design types E-H are to be distributed to the second channel, and items having design types I-L are to be distributed to the third channel.

At a checkpoint 308, the PLC 200 determines if there are specific sequences of items to be placed in the four channels. In one implementation, the PLC 200 accesses the memory/storage device 208 to determine in any such sequence information is available or has been previously stored by the PLC 200. The sequence information specifies sequences that may be used by the sorter 100 for the items in the channel conveyors 102 having the specified number of different types of image designs. The sequence information may depend on the number of different types of image designs. In one implementation, the sequence information may further depend on the type of item (e.g., paper plate, baseball card, plastic cup holder, etc.).

If there is sequence information, the PLC 200 determines if there are selection arrangements for viewable items at a checkpoint 310. Selection arrangement information is stored in the memory/storage device 208 of the PLC 200, according to one implementation. The selection arrangement information specifies a selection of items to be dispensed during a given dispensing cycle, such that certain selected items are placed at the top of stacks in the stacking area 108 and can be viewed by customers when packaged in transparent or semi-transparent material.

Figure 3B:
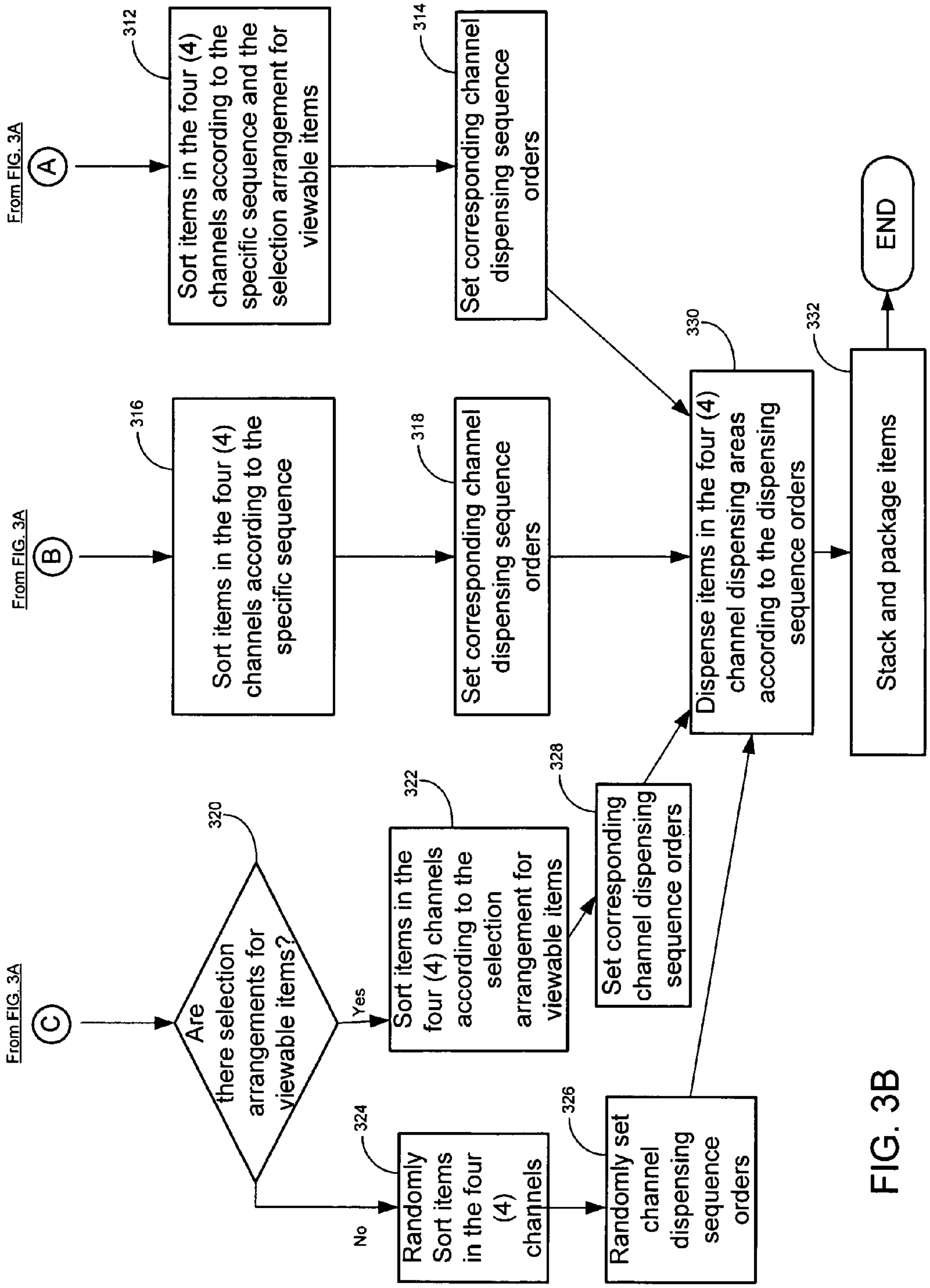

If there are selection arrangements that are identified, the PLC 200 causes the sorter 100 to sort items in an act 312 in the four channels for transportation by the channel conveyors 102 according to the specific item sequences and the selection arrangements that are to be implemented, as is shown in FIG. 3B. The PLC 200 further causes the sorter 100 to set corresponding channel dispensing sequence orders that are to be used during the various dispensing cycles for items in the dispensing areas 104. The sorter 100 will use these dispensing sequences of the items from the dispensing areas 104 to sort the items in the stacking area 108 according to the specified sequences for given items and also to place given items on the top of individual stacks within the stacking area 108 according to the selection arrangements. The items are thereby stacked in a given sequence, and specified items are placed at the top of stacks.

If there are no selection arrangements that are identified at the checkpoint 310, the PLC 200, in an act 316, causes the sorter 100 to sort the items in the four channels according to the specific sequence. In an act 318, the PLC 200 causes the sorter 100 to set corresponding channel dispensing sequence orders for items in the channel dispensing areas 104 according to the specific sequences that are to be used.

If there is no such sequence information identified by the PLC 200 at the checkpoint 308, the PLC 200 determines if there are selection arrangements for viewable items at a checkpoint 320. If there are not, the PLC 200 causes the sorter 100 to randomly sort items in the four channels and also to randomly set channel dispensing sequence orders in acts 324 and 326. If there are selection arrangements for viewable items that are identified, however, the PLC 200 causes the sorter 100 to sort items in the four channels according to these selection arrangements in an act 322. The sorter 100 sorts the items to ensure that specified items will be available for dispensing as top items in stacks during given dispensing cycles. The PLC 200 causes the apparatus 100, in an act 328, to set corresponding channel dispensing sequence orders. In one implementation, where sensors are positioned above the channel dispensing areas 104 to identify specific images printed on plates, the act 322 is not needed. In this implementation, the sensors provide input information to the PLC 200, which then uses the selection arrangement information to cause the sorter 100 to set an appropriate dispensing sequence order for items in the dispensing areas 104 to ensure that a corresponding plate is positioned as the top plate in a stack within the stacking area 108.

In an act 330, the PLC 200 causes the sorter 100 to dispense the items in the four channel dispensing areas 104 onto the conveyor 106 according to the dispensing sequencing orders that were previously set. In an act 332, the sorter 100 stacks items in the stacking area 108 and packages the items after they have been transported by the loading conveyor 110.

Figure 4:
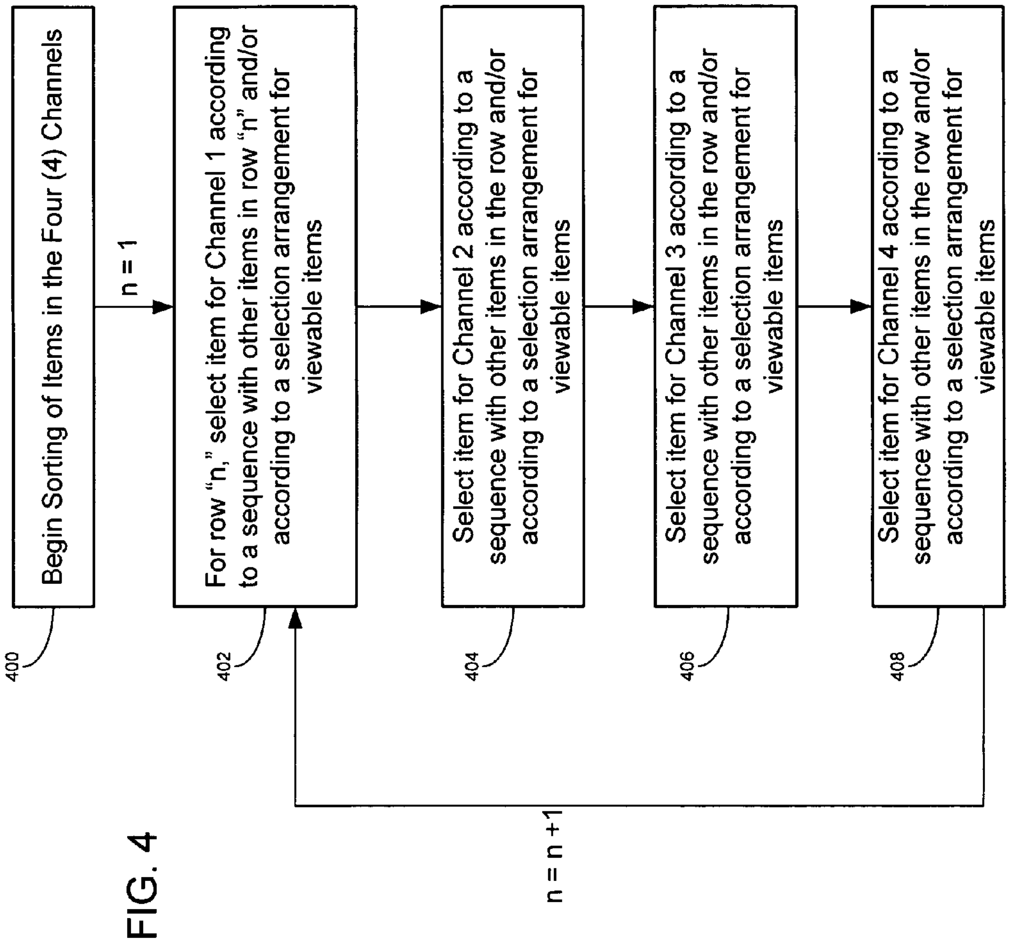

FIG. 4 is a flow diagram of a sorting method that may be used by the apparatus 100. The sorter 100 may receive signals from the PLC 200 to perform this method. In one implementation, the sorter 100 may perform this method during the acts 322, 316, and/or 312 shown in FIG. 3B. In an act 400, the sorter 100 begins the sorting process for items that are contained within the four channel conveyors 102. The sorter 100 sorts items in rows, and the items are then transported by the channel conveyors 102 to the holding areas. According to one implementation, each row of items transported by the channel conveyors 102 contains four items. For each row, the sorter 100 performs the acts 402, 404, 406, and 408.

In the act 402, the sorter 100 selects an individual item for the first channel, Channel 1, according to any sequence with other items in the row and any selection arrangement that is to be used for viewable items. As described above, the sorter 100 may have access to, or receive signal information from the PLC 200 based upon, sequence and/or selection arrangement information for viewable items. The sequence information specifies certain sequences of items (e.g., first, second, third, fourth) that are to be used when creating stacks of items within the stacking area 108 of the apparatus 100. The selection arrangement information specifies which items are be situated at the top of given stacks. The sorter 100 may need to sort items in a given row to conform to the specifications of the sequence and/or selection arrangement. The sorter 100 may then use specified dispensing sequences of items from the channel dispensing areas 104 to load items onto the dispensing conveyor 106 and to stack items in the stacking area 108. In the acts 404, 406, and 408, the sorter 100 selects items for the second, third, and fourth channels in the row according to sequences to be used in respect to other items in the row and according to any selection arrangement for viewable items.

Figure 5:
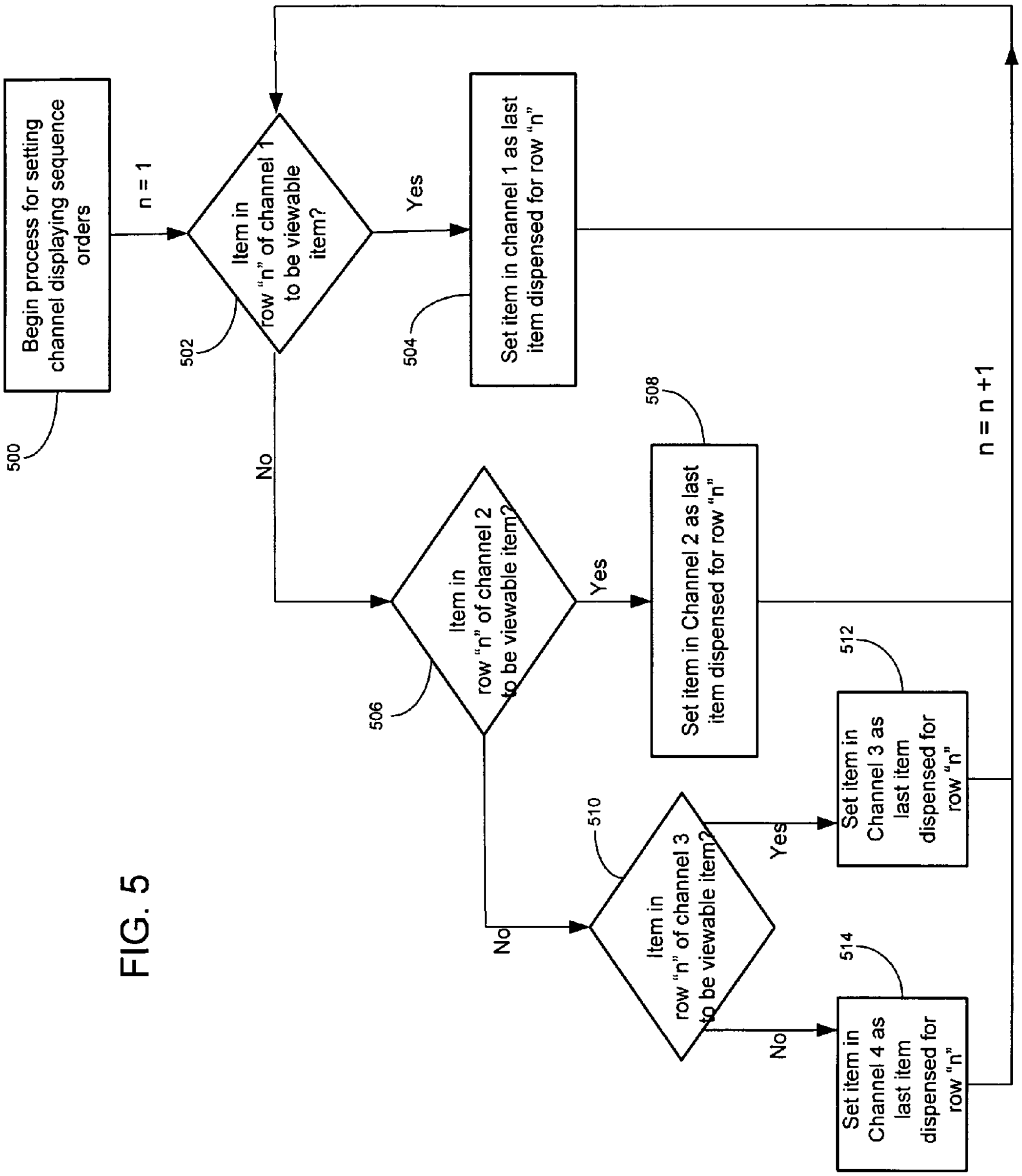

FIG. 5 is a flow diagram of a method that sets dispensing sequence orders for items in the dispensing areas 104. In one implementation, this method is performed during the acts 328, 318, and/or 314 shown in FIG. 3B. The method begins with an act 500 for setting these orders. At a checkpoint 502, the PLC 200 determines if there is an item within the first channel of a given row on the channel conveyors 102 that is to be a viewable, top item in a stack of items for that row. The PLC 200 uses selection arrangement information to make this determination. If an item is a top item in a given stack, an individual, such as a customer, is capable of viewing this item once it is packaged with the stack. In particular, the individual can view the image that is printed on this top item.

If the item in the first channel of a given row is to be a viewable item, then the PLC 200 causes the apparatus 100, in an act 504, to set this item in the first channel as the last item to be dispensed in its row when that same row of items has been transported into the channel dispensing areas 104. A given row of items is transported by the channel conveyors 102 into the holding areas and then later into the channel dispensing areas 104. If the item in the first channel of the dispensing areas 104 is the last item dispensed in that row for a given dispensing cycle, it will be the top-most item in the stack of items for that row in the stacking area 108.

The PLC 200 determines if the items in the second or third channels in a given row are to be viewable items at checkpoints 506 and 510. If an item in one of these channels is to be viewable items, the PLC 200 causes the sorter 100 to set the item (in its respective channel) as the last item to be dispensed for that row when present in the channel dispensing areas 104 in a given dispensing cycle (in acts 508 and 512). If there are no items in the first, second, or third channels that are to be viewable items in a stack of items for that row, the PLC 200 causes the apparatus 100, in an act 514, to set the item in the fourth channel as the last item to be dispensed.

Figure 6:
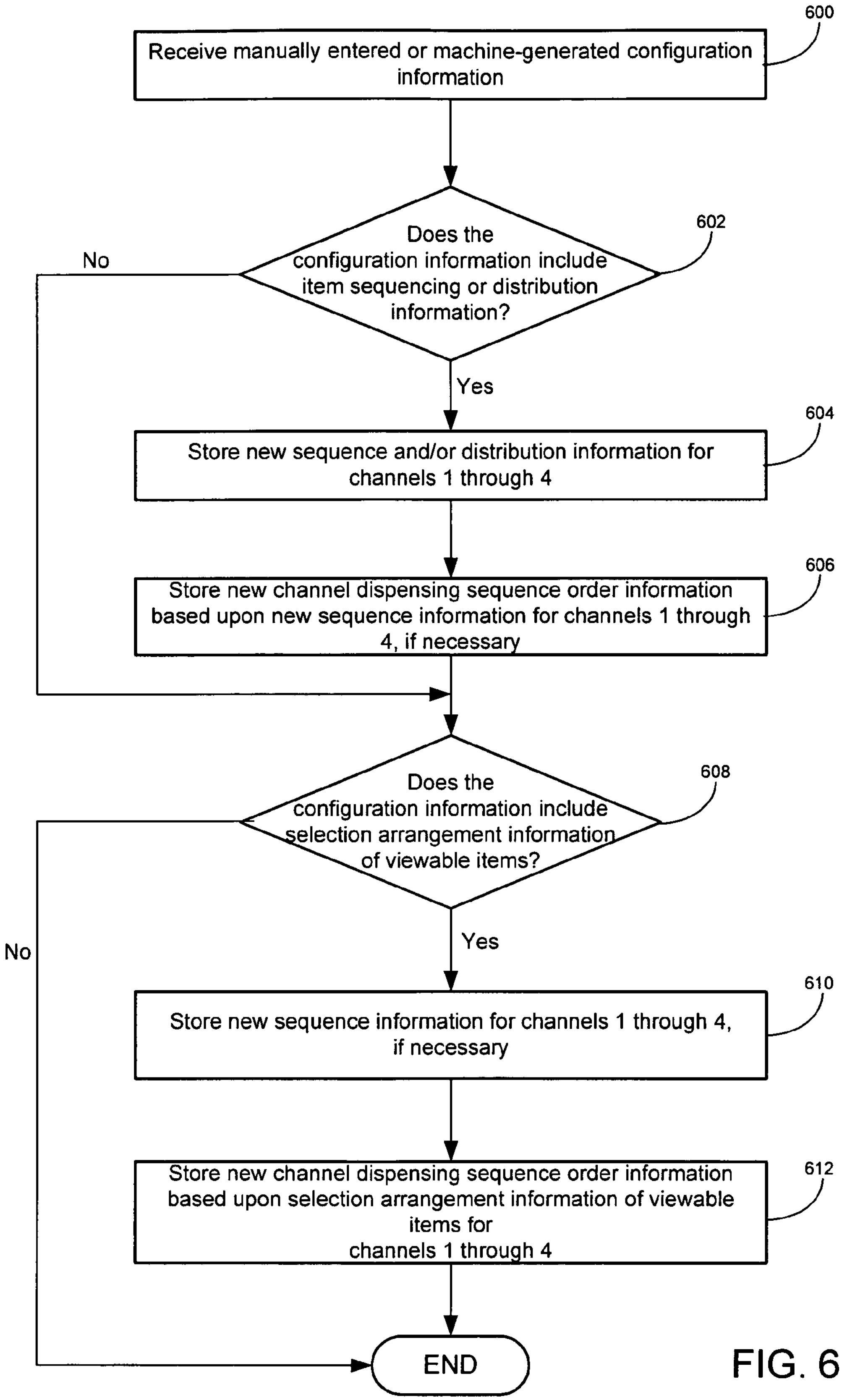
FIG. 6 is a flow diagram of a method for providing configuration information to the programmable logic circuit (PLC) of FIG. 2, according to one implementation.

FIG. 6 is a flow diagram of a method for providing configuration information to the PLC 200 of FIG. 2, such as sequencing or selection arrangement information. As shown in FIG. 2, this configuration information is provided to the memory/storage device 208. In an act 600, the PLC 200 receives manually entered or machine-generated configuration information. As described earlier, the PLC 200 may receive data input that has been manually entered by a user or that have been provided by a computing device. At a checkpoint 602, the PLC 200 determines if the received configuration information includes item sequencing or distribution information. If so, the PLC 200 stores in the memory/storage device any new sequence and/or distribution information for the four channels used in the sorter 100 during an act 604. The distribution information can be used to distribute various different items (having different images printed thereon) across the four different channels in the channel conveyors 102. The sequence information can be used to sort items in the four channels. In an act 606, the PLC 200 also stores, if necessary, any new channel dispensing sequence order information that is based upon new sequence information for the four channels. In certain situations, the PLC 200 will store new dispensing sequence orders based upon item sequence information that has been specified. These dispensing sequence orders will determine the sequence in which items for a given row are stacked within the stacking area 108. However, in certain other situations, the PLC 200 will not need to store new sequence orders if the item distribution and sequencing on the channel conveyors 102 ensures that items will be stacked in the proper sequence in the stacking area 108 using current dispensing sequence orders.

At a checkpoint 608, the PLC 200 determines if the configuration information includes selection information for viewable, or top, items in stacks. If it does, the PLC 200 stores new sequence information to be used for sorting items in the four channels on the channel conveyors 102, if necessary. In certain situations, the PLC 200 may change the sorting sequence to accommodate a selection of top items specified by the selection information of viewable items. The PLC 200 also stores, in an act 612, new channel dispensing sequence order information for the four channels in the memory/storage device 208 based upon the selection information of viewable items. The new dispensing sequence order information is used to affect the dispensing sequences to dispense items from the dispensing areas 104 over various different dispensing cycles.

Figure 7:
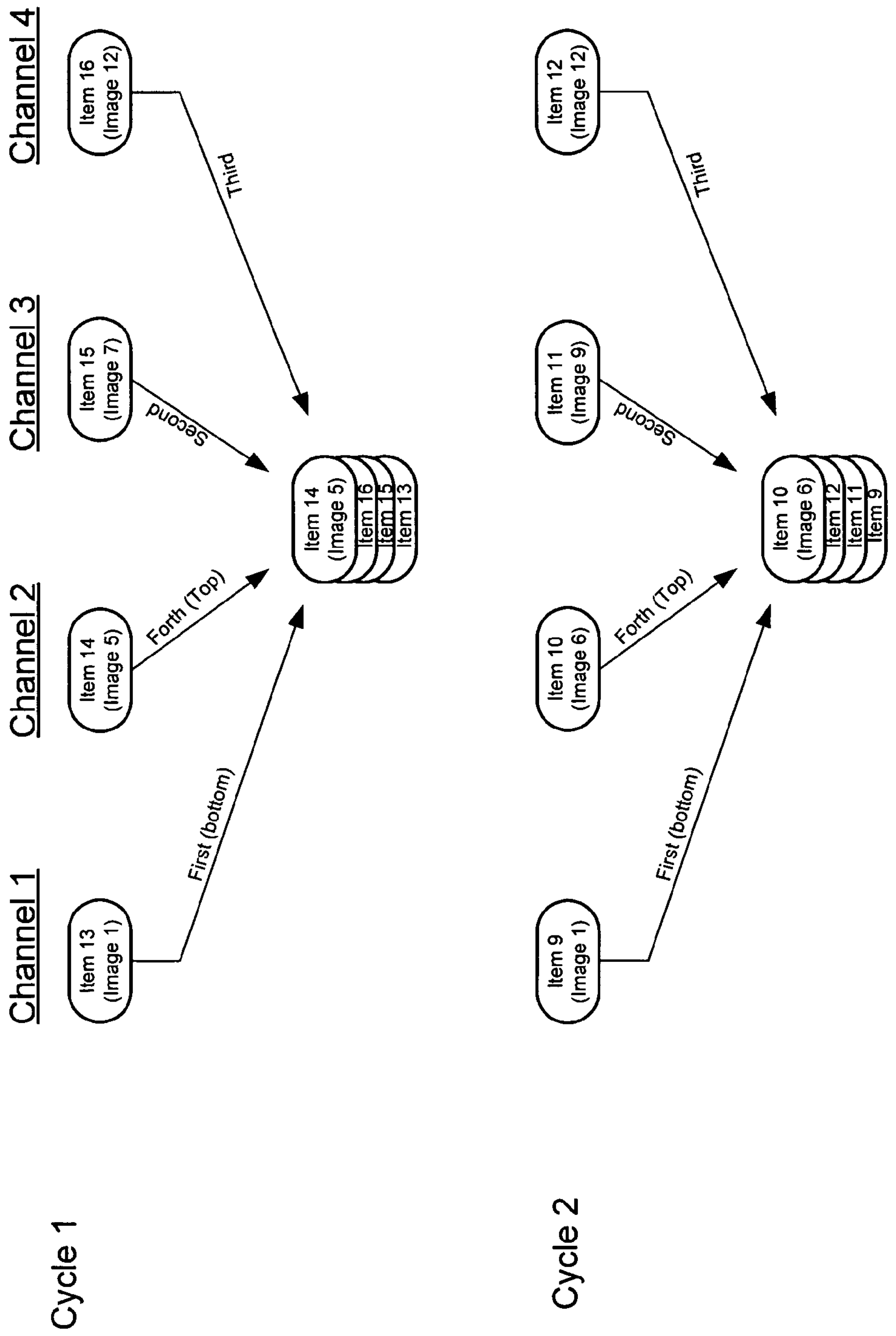
FIG. 7 is a diagram of a first exemplary dispensing and stacking operation that may be performed by the apparatus shown in FIG. 1A.

FIG. 7 is a diagram of a first exemplary dispensing and stacking operation that may be performed by the sorter 100 shown in FIG. 1A. In this example, the channel dispensing areas 104 contain four items, one per channel. The first channel dispensing area contains "Item 13", which has "Image 1" printed thereon. The second channel dispensing area contains "Item 14", which has "Image 5" printed thereon. The third channel dispensing area contains "Item 15", which has "Image 7" printed thereon. The fourth channel dispensing area contains "Item 16", which has "Image 12" printed thereon.

The sorter 100 uses dispensing sequence orders to dispense items from the dispensing areas 104 during various dispensing cycles. FIG. 7 shows an example of two such dispensing cycles. During the first cycle, the sorter 100 dispenses "Item 13" from the first channel dispensing area as the first item (onto the conveyor 106). Because this item is dispensed first, it will be placed on the bottom of the stack for these four items in the stacking area 108. The sorter 100 dispenses "Item 15" from the third channel dispensing area as the second item, and dispenses "Item 16" from the fourth channel dispensing area as the third item. Finally, the sorter 100 dispenses "Item 14" from the second channel dispensing area as the fourth and last item during this dispensing cycle. Because it is the last item dispensed, "Item 14" is the top-most item in the stack as formed within the stacking area 108.

During the second cycle, the sorter 100 dispenses "Item 9" from the first channel dispensing area as the first item. Because this item is dispensed first, it will be placed on the bottom of the stack for these four items in the stacking area 108. The sorter 100 dispenses "Item 11" from the third channel dispensing area as the second item, and dispenses "Item 12" from the fourth channel dispensing area as the third item. Finally, the sorter 100 dispenses "Item 10" from the second channel dispensing area as the fourth and last item during this dispensing cycle. Because it is the last item dispensed, "Item 10" is the top-most item in the stack as formed within the stacking area 108.

During subsequent dispensing cycles, the sorter 100 continue to dispense items from the dispensing areas 104. The sorter 100 may use various different dispensing sequence orders when dispensing items over multiple cycles. For example, in one implementation, the sorter 100 may use a repetitive set of dispensing sequence orders to ensure that there is an equal distribution of images that are printed on the top items of newly created stacks in the stacking area 108. If there are twelve different images that may be printed on items, the sorter 100 may create twelve different stacks in a series, such that each stack in the series has a top item with a different image printed thereon. The sorter 100 may also control the number of plates in each created stack that have certain images printed thereon.

Figure 8:
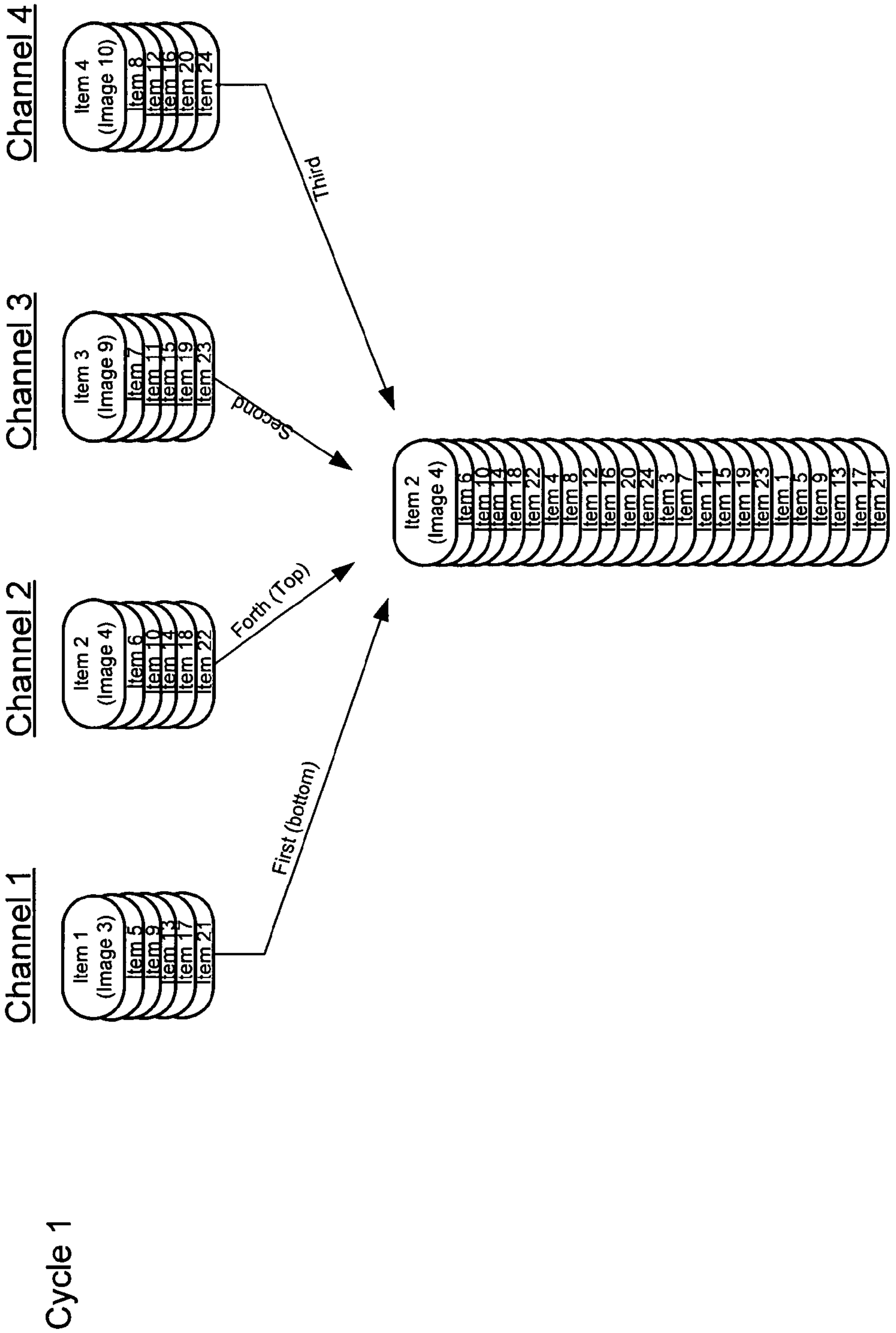
FIG. 8 is a diagram of a second exemplary dispensing and stacking operation that may be performed by the apparatus shown in FIG. 11A.

FIG. 8 is a diagram of a second exemplary dispensing and stacking operation that may be performed by the sorter 100 shown in FIG. 1A. In this example, the channel dispensing areas 104 contain twenty-four items, six per channel. As described earlier, stacks of items may be formed within the holding areas and the dispensing areas 104. The first channel dispensing area contains the following stack of items: "Item 1" (which has "Image 3" printed thereon, and which is the top-most item); "Item 5"; "Item 9"; "Item 13"; Item "17"; and "Item 21". The second channel dispensing area contains the following stack of items: "Item 2" (which has "Image 4" printed thereon, and which is the top-most item); "Item 6"; "Item 10"; "Item 14"; Item "18"; and "Item 22". The third channel dispensing area contains the following stack of items: "Item 3" (which has "Image 9" printed thereon, and which is the top-most item); "Item 7"; "Item 11"; "Item 15"; Item "19"; and "Item 23". The fourth channel dispensing area contains the following stack of items: "Item 4" (which has "Image 10" printed thereon, and which is the top-most item); "Item 8"; "Item 12"; "Item 16"; Item "20"; and "Item 24".

The sorter 100 uses dispensing sequence orders to dispense items from the dispensing areas 104 during various dispensing cycles. FIG. 8 shows an example of one such dispensing cycle. During the first cycle, the sorter 100 first dispenses the stack of items from the first channel dispensing area. The complete stack is dispensed onto the conveyor 106. In one implementation (not shown), the sorter 100 may rearrange the items in the stack when they are loaded onto the conveyor 106 using additional hardware mechanisms. Because the stack of items from the first channel dispensing area is dispensed first, it will be placed on the bottom of the new, larger stack that is formed in the stacking area 108. The sorter 100 next dispenses the stack of items from the third channel dispensing area, and then dispenses the stack of items from the fourth channel dispensing area. Finally, the sorter 100 dispenses the stack of items from the second channel dispensing area during the final phase of this dispensing cycle. Because it is the last stack dispensed, the stack of items from the second channel dispensing area is located at the top of the new, larger stack that is formed in the stacking area 108. As shown in FIG. 8, the top-most item of the new, larger stack is "Item 2", which was also the top-most item in the stack contained within the second channel dispensing area at the beginning of the cycle.

During subsequent dispensing cycles, the sorter 100 continue to dispense items from the dispensing areas 104. The sorter 100 may use various different dispensing sequence orders when dispensing items over multiple cycles. For example, in one implementation, the sorter 100 may use a repetitive set of dispensing sequence orders to ensure that there is an equal distribution of images that are printed on the top items of newly created stacks in the stacking area 108. If there are twelve different images that may be printed on items, the sorter 100 may create twelve different stacks in a series, such that each stack in the series has a top item with a different image printed thereon. The sorter 100 may also control the number of plates in each created stack that have certain images printed thereon.

In other implementations, the algorithm executed by the PLC may determine the order and/or the viewable image according to a user-specified statistical biasing or weighting protocol. In one example of such a protocol, the selection of the viewable image is determined by generation of a random number and comparison of the number or numerical ranges which are weighted to empirical data, such as historical sales data. For instance, where sales data indicates that packages having items bearing viewable image #3 sold best, followed by packages having items bearing viewable images #2, #1, and #4, respectively, the algorithm can be structured to provide a disproportionate ordering or selection of viewable images in the packaged arrangements that are created. The viewable images are those borne upon items that are positioned at the top of packaged arrangements, according to one implementation. In the example above, the algorithm executed by the PLC may determine that image #3 is to be the viewable image on 60% of the packaged arrangements and that image #2 is to be the viewable image on the remaining 40% of packaged arrangements. (Image #3 may comprise a movie character or animal, in one example, that is very popular and appealing to certain customer bases, as evidenced by empirical sales data.) The use of a random number generator ensures that the packaged arrangements bearing these viewable images come off the production line in a non-uniform and random order, but still in the statistically desired percentages.

In other situations, where it is desired that the production sequence be controlled more deliberately so as to control aggregation and shipping of the packaged arrangements, the random number generator may be bypassed in favor of a fixed algorithm. The fixed algorithm may also be based upon a user-specified selection preference of image #3 based upon empirical sales history data. The fixed algorithm may generate, for instance, 6 packaged arrangements out of every 10 with image #3 as the viewable image. As can be seen with the fixed algorithm, exactly 60 out of every 100 packaged arrangements will have an item bearing image #3 as the viewable image. The use of the fixed algorithm may be useful when smaller quantities of packed arrangements are shipped to stores or other retail outlets. For example, in certain situations, a given store may only receive a shipment of twenty or thirty packaged arrangements. In these situations, the PLC may execute the fixed algorithm to ensure that 6 out of every 10 arrangements contained within the shipment have image #3 as the viewable image. If a randomized algorithm were to be used in these situations, it is possible that an undesirable distribution of arrangements with image #3 as the viewable image may be provided within the small shipment. In other situations, when stores receive very large shipments of arrangements, the randomized algorithm may be used to provide an overall, statistically desired percentage of arrangements having image #3 as the viewable item.

In still other situations, the PLC may execute a combination of the fixed and randomized algorithms. When shipments contain both large shipment containers and small shipment containers, all of which may be sent to a given store, the PLC may execute the fixed algorithm when providing arrangements to the small containers, and may execute the random algorithm when providing arrangements to the large containers.

The store may open the small containers first to obtain arrangements that may be displayed to customers, and may use the arrangements from the large containers for re-stocking purposes. By implementing both the fixed and random algorithms, a desired percentage of arrangements having image #3 as the viewable image may be provided in both the small and large containers.

A number of implementations have been described. Nevertheless, it will be understood that various modifications may be made without departing from the spirit and scope of these implementations. Accordingly, other implementations are within the scope of the following claims.

What is claimed is:

1. In a system for handling image-bearing items, a method for creating a sorted arrangement of image-bearing items comprising:

receiving a user input specifying a preference associated with a top surface image borne on at least one of the items, said input indicating a position of at least one image-bearing item in the arrangement;

providing a plurality of image-bearing items in a first sequence, said items bearing a plurality of distinct images;

sorting the image-bearing items in a second sequence different from the first sequence according to said user input; and packaging the image-bearing items such that an order of the image-bearing items reflects the preference associated with the top surface image borne on at least one of the items.

2. The method of claim 1, comprising packaging a stack of image-bearing items with a packaging material that is at least partially transparent such that at least one of the images is viewable through said packaging material.

3. The method of claim 1, comprising selecting an image-bearing item that is to be preferentially positioned on a top of the arrangement of said image-bearing items.

4. The method of claim 3, wherein the image-bearing items are plates.

5. The method of claim 4, wherein the images are associated with movie characters or animals.

6. The method of claim 1, wherein the preference is derived from empirical data or observations concerning sales of the image-bearing items.

7. The method of claim 6, wherein the data or observations reflect relative sales of packages of image-bearing items having different images viewable through associated product packaging.

8. The method of claim 1, wherein the user input specifies positions of a plurality of items in the arrangement.

9. The method of claim 8, wherein the user input specifies a sequence of at least a majority of the items in the arrangement.

10. The method of claim 9, wherein two of at least three items are adjacent.

11. The method of claim 1, wherein sorting is randomized but statistically weighted according to the user input such that the packaged arrangements are disproportionately ordered consistent with said preference.

12. The method of claim 1, wherein the image-bearing items are selected from a group consisting of cards and stationery.

13. A material-handling system to handle image-bearing items, the system comprising:

means for obtaining a plurality of items, each item bearing a top surface image selected from a set of images;

means for sorting the items according to a user input specifying a preference for a positioning of at least one top-facing image in a stack of said items; and means for stacking the items into a plurality of stacks such that the items are stacked in an order consistent with the user input, each stack in the plurality of stacks having an identical quantity of the items.

14. The system of claim 13, wherein the user input specifies a preference that at least one image be disproportionately placed on tops of stacks of said items.

15. The system of claim 13, wherein the user input specifies a sequence of a plurality of adjacent items in stacks of said items.

16. The system of claim 13, wherein the user input specifies empirical data or observations concerning sales of said items.

17. In a system for handling image-bearing items, a method for creating a sorted arrangement of image-bearing items comprising:

providing a plurality of image-bearing items selected from a group consisting of plates, greeting cards, and stationery, said items bearing a plurality of distinct images;

receiving a user input specifying a preference associated with an image borne on at least one of the plurality of image-bearing items, said input indicating a selected image-bearing item that is to be preferentially positioned on a top of a sorted arrangement of image-bearing items;

sorting the image-bearing items according to said user input; and packaging a plurality of stacks of the image-bearing items in sorted arrangements with a packaging material that is at least partially transparent such that the image-bearing item positioned on top of each stack is viewable through said packaging material, wherein the sorting is at least partially randomized but statistically weighted according to the user input such that the image-bearing items viewable on top of the packaged stacks are disproportionately ordered consistent with said preference.

18. The method of claim 17, wherein the images borne of the items are associated with movie characters or animals.

19. The method of claim 17, wherein the preference is derived from empirical data or observations concerning sales of the image-bearing items.

20. The method of claim 19, wherein the data or observations reflect relative sales of packages of image-bearing items having different images viewable through associated product packaging.

21. The method of claim 17, wherein the user input specifies positions of a plurality of items in each packaged stack.

22. The method of claim 21, wherein the user input specifies a sequence of at least a majority of the items in each packaged stack.

* * * * *